Feb. 9, 1926.
H. T. WHITE
1,572,829
GEAR SHIFT CONTROL
Filed June 4, 1924    2 Sheets-Sheet 1
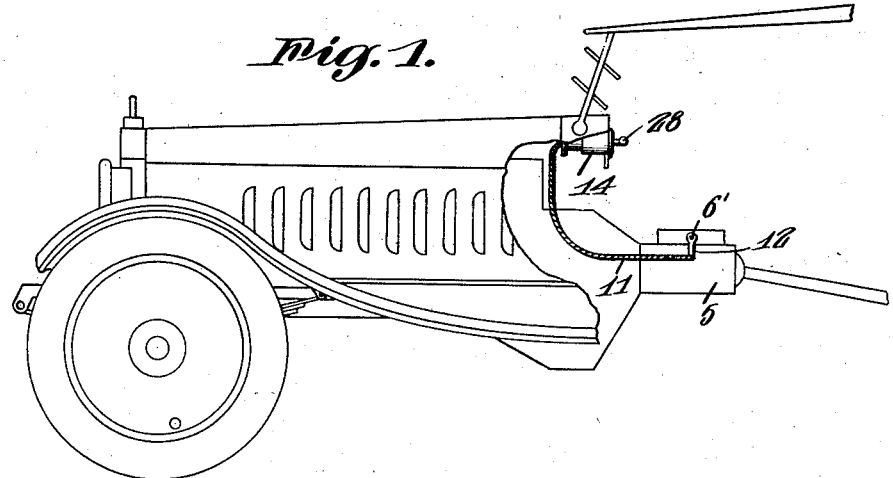
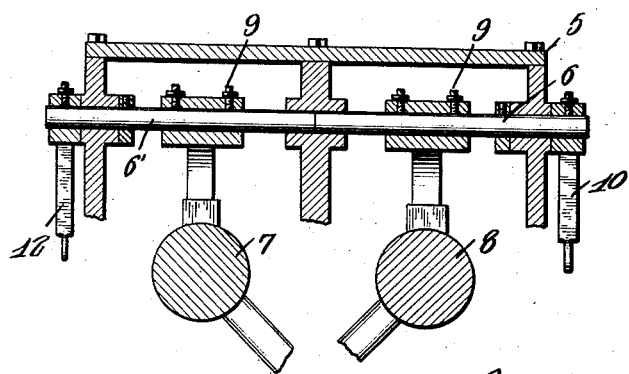
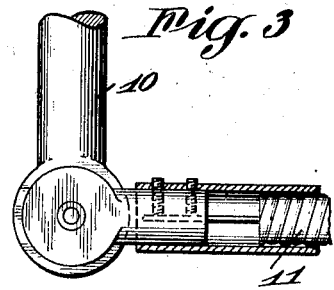
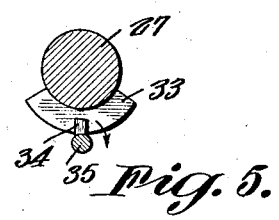
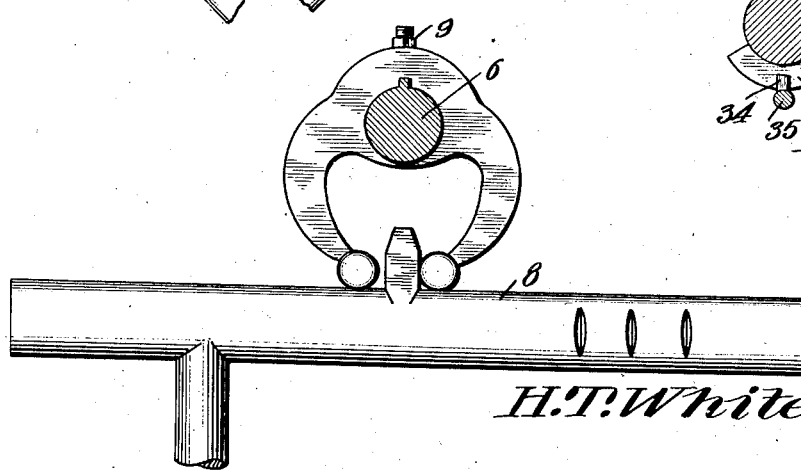
H. T. White, Inventor

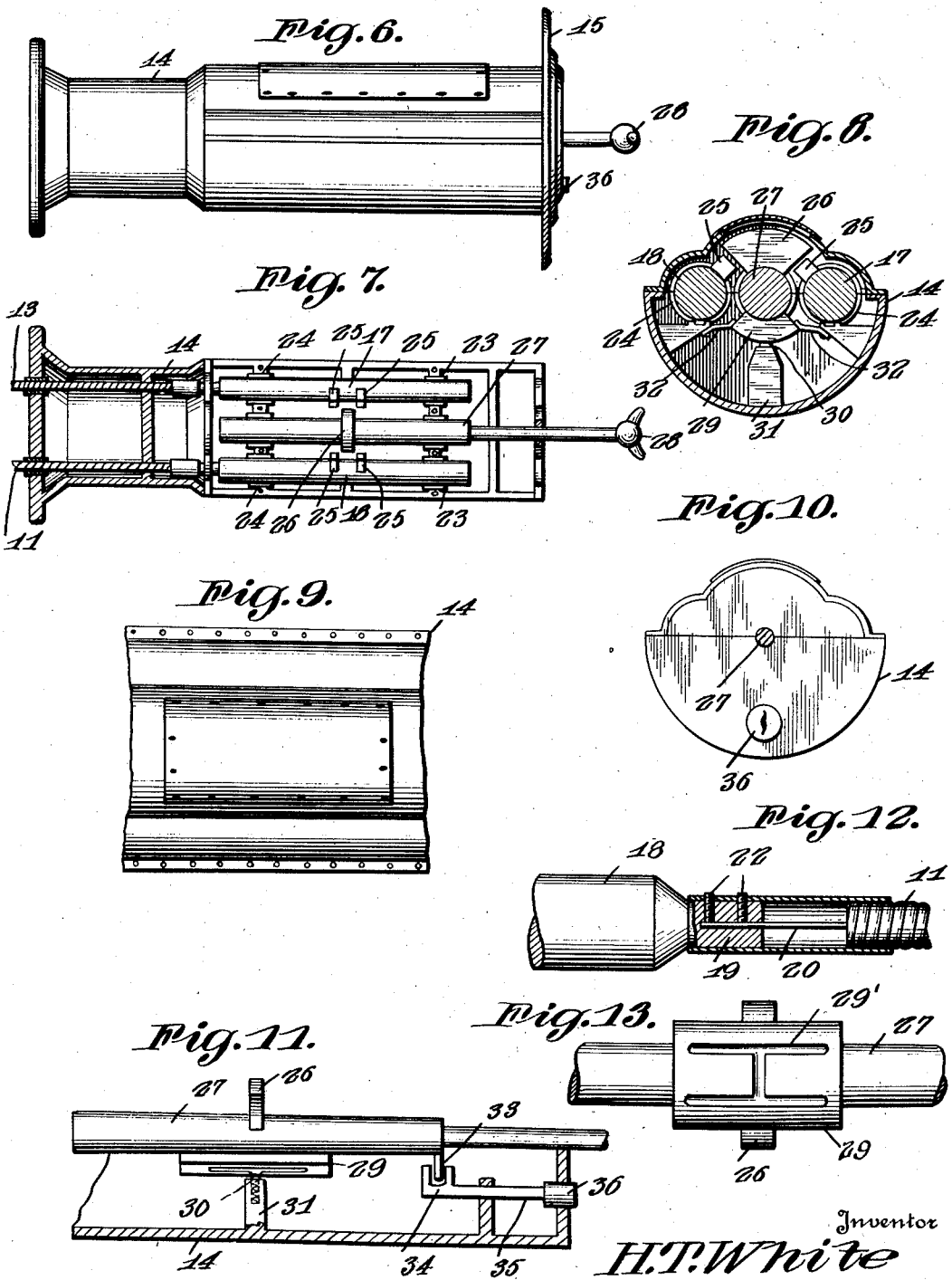

Patented Feb. 9, 1926.

1,572,829

UNITED STATES PATENT OFFICE.

HUGH T. WHITE, OF DALLAS, TEXAS.

GEAR-SHIFT CONTROL.

Application filed June 4, 1924. Serial No. 717,809.

*To all whom it may concern:*

Be it known that I, HUGH T. WHITE, a citizen of the United States, residing at Dallas, in the county of Dallas and State of Texas, have invented a new and useful Gear-Shift Control, of which the following is a specification.

The present invention relates to a device especially designed for use in connection with a transmission of a motor vehicle and aims to provide novel means whereby the gears of a transmission may be thrown into and out of operation from a point adjacent to the instrument board of the vehicle, thereby eliminating the use of a shifting lever which usually extends through the floor board of the car.

An important object of the invention is to provide a device of this character to facilitate the operation of the gears with the minimum amount of exertion on the part of the operator.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a fragmental elevational view disclosing the device constructed in accordance with the invention, as positioned on a motor vehicle.

Figure 2 is a sectional view through the upper portion of a transmission housing disclosing the operating means.

Figure 3 is a fragmental detail view disclosing the manner of connecting the cable through the operating arm.

Figure 4 is an elevational view disclosing the means for operating the rods of the transmission.

Figure 5 is an elevational view disclosing the controlling rod and locking flange.

Figure 6 is a side elevational view of the controlling device forming a part of the invention.

Figure 7 is a longitudinal sectional view through the controlling device.

Figure 8 is a transverse sectional view through the controlling device.

Figure 9 is a plan view of the plate that covers the controlling device.

Figure 10 is an end elevational view of the controlling device.

Figure 11 is a longitudinal sectional view taken at right angles to Figure 7 and illustrating the locking member.

Figure 12 is a detail view partly in section disclosing the means for connecting the cable to the operating rods.

Fig. 13 is an enlarged view of part 29 shown in Fig. 11.

Referring to the drawings in detail, the reference character 5 indicates a transmission housing in which the usual transmission gearing is located together with the operating rods for actuating the gearing, to move the gearing to its various positions.

The operating rods are controlled by the movement of the shaft 6, the rods being indicated at 7 and 8 respectively and secured to the shafts 6' and 6 as indicated at 9.

As shown, this shaft 6 extends beyond one wall of the transmission housing where it provides a support for the operating arm 10, which is controlled by the movement of the flexible operating member or cable 11.

The shaft 6' extends beyond the opposite wall of the transmission housing and supports the arm 12 which has connection with a suitable operating cable 13. The cables 11 and 13 extend into a housing indicated at 14, which is constructed for positioning behind the instrument board of a motor vehicle, the housing 14 being provided with an end plate 15 through which the operating rod moves, the cables having connection with the sliding operating rods 17 and 18 respectively, whereby movement of the rods produces a relative movement of the cables to accomplish the shifting of the gears.

Each rod is formed with a reduced portion 19 having an opening to accommodate the extension 20 of the cables 11 and 13 associated therewith, set screws 22 being provided to secure the cable against movement. These rods are supported in bearings 23 and 24, and as shown, are provided with laterally disposed enlargements 25 arranged in spaced relation with each other and disposed centrally of the rods to be engaged by the enlargement 26 carried by the controlling rod 27.

The controlling rod extends through one end of the housing and is supplied with an operating handle 28 whereby the operator may manipulate the rod 27 to cause it to engage the enlargements 25 and move the cables associated therewith.

In order that the rod 27 will be held in various positions of adjustment, an elongated enlargement 29 is provided directly under the rod 27 which is supplied with depressed portions 29′ designed to accommodate the ball bearing 30 supported in the upstanding finger 31, when the rod 27 has been tilted sideways.

Spring fingers 32 are also supported within the housing and engage opposite sides of the enlargement 29 so that the rod will be normally held in its neutral position and may only be moved, against the tension of the springs 32. At one end of the rod 27 is a depending flange 33 adapted to be engaged by the flanged end 34 of the locking bar 35 which is formed with a key opening 36 to prevent the operation of the bar 35 by unauthorized persons.

When it is desired to lock the rod 27 against movement, a suitable key is inserted in the lock 36 and the bar 35 moved to a position as indicated by Figure 11.

From the foregoing it will be obvious that due to the construction as shown and described, a person may operate the gears of a transmission to shift them into their various positions of operation from a point adjacent to the operator's seat, eliminating the necessity of having the usual objectionable gear shift lever extending upwardly through the floor board of the car.

I claim:—

1. A gear shifting mechanism for motor vehicles, comprising in combination with the gear shifting members of the transmission, a housing, operating rods slidably mounted within the housing and having inwardly extended spaced enlargements formed thereon, flexible members for connecting the operating rods to the gear shifting members of the transmission, a slidable rod disposed between the operating rods, said slidable rod being manually controlled, an enlargement carried by the last mentioned rod and extending upwardly therefrom, said enlargement adapted to be moved between the enlargements of the operating rods to move the operating rods, and means for normally holding the slidable rod normally against movement.

2. A gear shifting mechanism for motor vehicles, comprising in combination with the gear shifting members of the transmission, a housing, operating rods slidably mounted within the housing and having inwardly extended spaced lugs, a slidable controlling rod, said controlling rod being disposed between the first mentioned rods, an upper enlargement on the controlling rod, a lower enlargement on the controlling rod, said upper enlargement adapted to be moved between the lugs of the first mentioned rods to operate the first mentioned rods, spring members engaging the edges of the lower enlargement to normally hold the upper enlargement in an upright position, and means engaging the lower enlargement for locking the controlling rod against accidental displacement.

In testimony that I claim the foregoing as my own, I have hereto affixed my signature.

HUGH T. WHITE.